3 Sheets—Sheet 1.
L. GODDU,
Assignor by mesne assignments to The American Cable Screw Wire Co.
MACHINES FOR NAILING BOOT AND SHOE SOLES.
No. 7,358. Reissued Oct. 24, 1876.
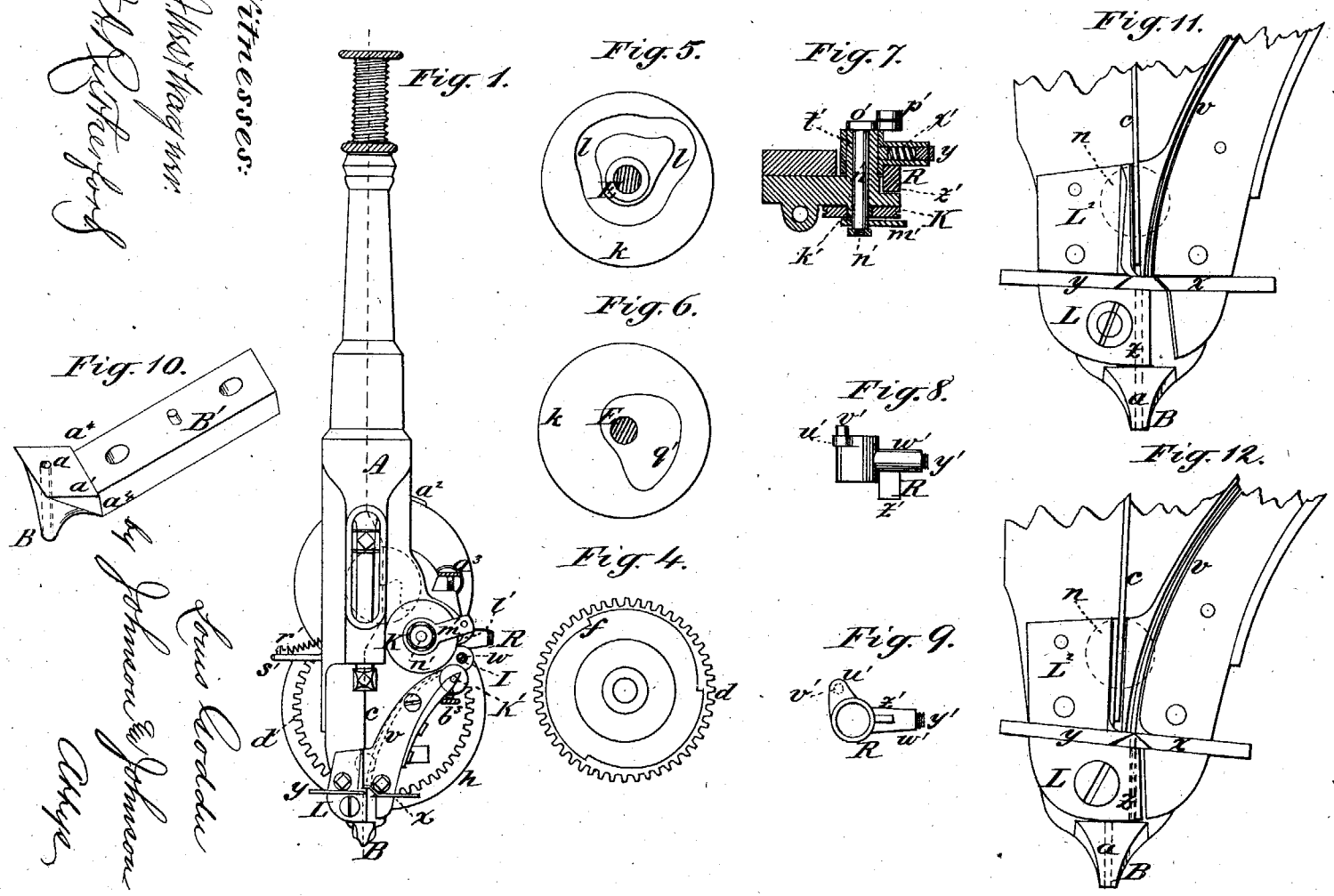
*Witnesses:*
J. W. Wagner
J. A. Rutherford
*Louis Goddu*
*by Johnson & Johnson*
*Attys*
N. PETERS, PHOTO-LITHOGRAPHER, WASHINGTON, D. C.

L. GODDU,
Assignor by mesne assignments to The American Cable Screw Wire Co.
MACHINES FOR NAILING BOOT AND SHOE SOLES.
No. 7,358. Reissued Oct. 24, 1876.
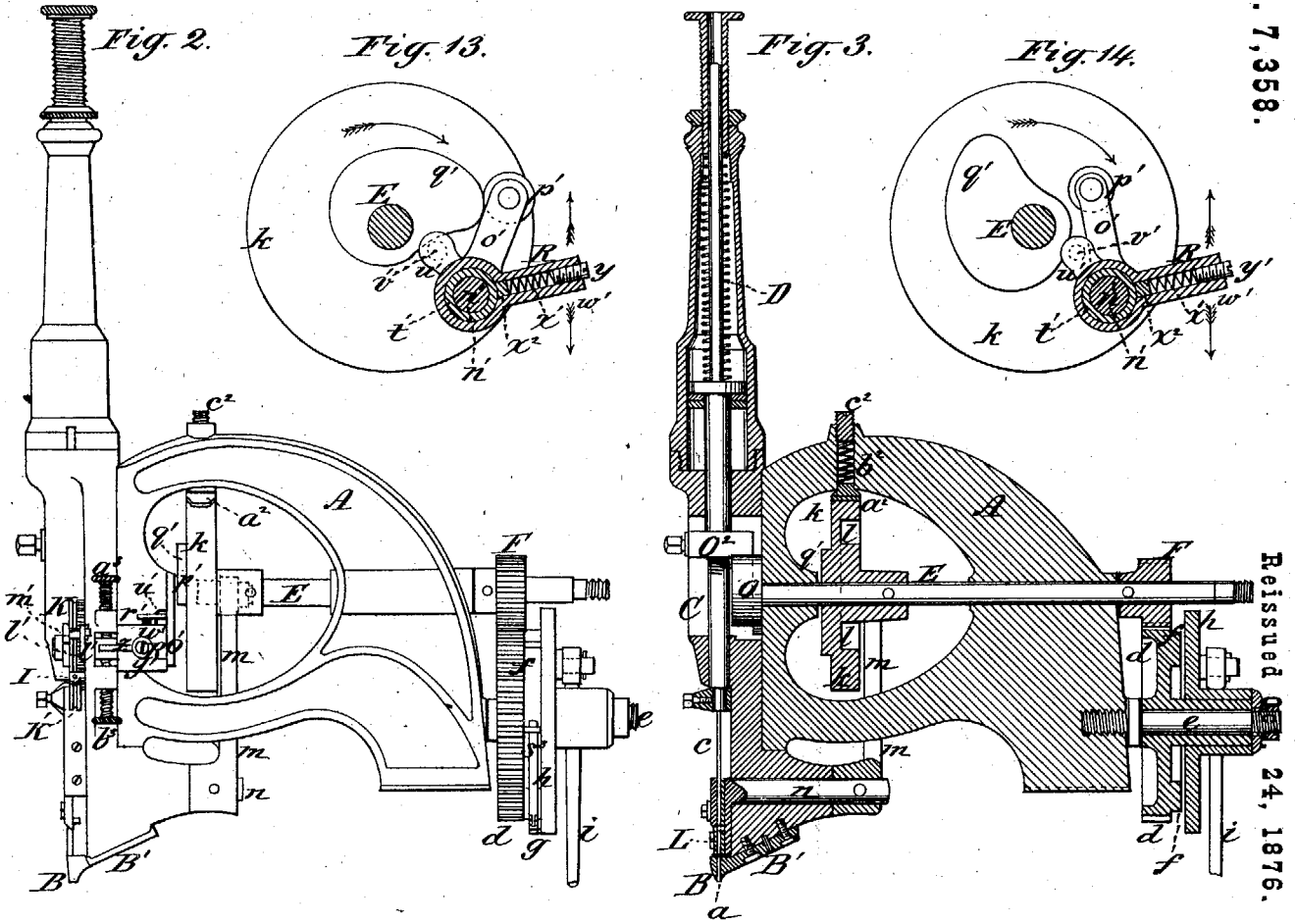
Witnesses:
J. Wm. Wagner.
J. A. Rutherford
Louis Goddu
by Johnson and Johnson
Attys.
N. PETERS, PHOTO-LITHOGRAPHER, WASHINGTON, D. C.

L. GODDU,
Assignor by mesne assignments to The American Cable Screw Wire Co.
MACHINES FOR NAILING BOOT AND SHOE SOLES.
No. 7,358. Reissued Oct. 24, 1876.
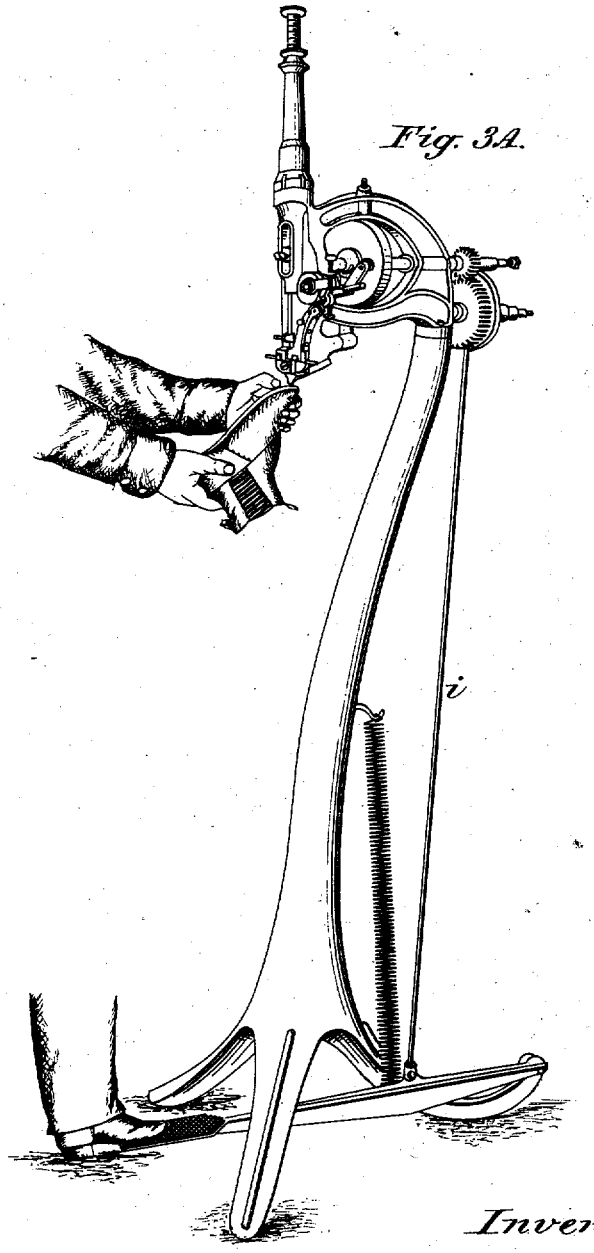
Witnesses:
J. West Wagner
J. A. Rutherford
Inventor:
Louis Goddu
by Johnson & Johnson
Attys
N. PETERS, PHOTO-LITHOGRAPHER, WASHINGTON, D. C.

UNITED STATES PATENT OFFICE.

LOUIS GODDU, OF BOSTON, MASS., ASSIGNOR, BY MESNE ASSIGNMENTS, TO THE AMERICAN CABLE SCREW WIRE COMPANY,

IMPROVEMENT IN MACHINES FOR NAILING BOOT AND SHOE SOLES.

Specification forming part of Letters Patent No. 122,377, dated January 2, 1872; reissue No. 7,358, dated October 24, 1876; application filed September 11, 1876.

DIVISION B.

*To all whom it may concern:*

Be it known that I, LOUIS GODDU, formerly of the Dominion of Canada, but now a citizen of the United States, and residing in Boston, in the county of Suffolk and State of Massachusetts, have made a new and useful invention or Improvement in Machines for Tacking Shoe-Soles or various other articles with wire; and I do hereby declare the same to be fully described in the following specification, and represented in the accompanying drawings, of which—

Figure 1 is a front elevation, Fig. 2 a side view, and Fig. 3 a vertical longitudinal section, of the head of a tacking-machine with my improvements or invention; and Fig. 3 A represents a view in perspective of the head as mounted upon its standard, and connected with the operating-treadle, and showing the manner of presenting and supporting the shoe to the nose by hand.

Such other figures or drawings as may be necessary to a full or proper illustration of my invention will be hereinafter referred to and described.

The machine exhibited by the said drawings is analogous to that patented to me November 23, 1869, No. 97,192, and reissued December 14, 1875, in the particulars of having a cutter carried by an intermittently-oscillating transferrer, into which the wire is fed, the nail severed and transferred in position to receive the action of the driver, and in connection with which feeding mechanism is employed to feed the wire to the cutters and transferrer.

The special object for which the present machine is designed is the fixing of soles or welts in place by a few nails or tacks preparatory to their being regularly pegged, nailed, or sewed to the upper of the shoe, an attendant presenting, as may be required, the lasted shoe to the nose of the machine, and at the same time operating the pedal of the machine by his foot, so as to put the machine in operation, and cause it to drive a nail or tack through such part of the sole or stock where it may be desirable to have one inserted.

The invention claimed herein consists of a machine for tacking shoe-soles, wherein tack feeding, cutting, and driving mechanisms are combined and adapted for use with the unobstructed stationary nose-tube, the standard, and the treadle-power mechanism, all substantially as described, whereby the shoe may be presented and manipulated by the operator.

Heretofore soles have been tacked or fastened slightly by hand before the last was removed to sew on the sole, or before it was permanently fastened with pegs or screw-wire. If this was not done the sole would get out of place in sewing or nailing. From eight to ten nails or tacks or more are required to secure a sole so as to hold it properly in place for nailing or sewing. By my machine a man can do from eight hundred to one thousand pairs daily.

The nose of the machine is made small, so as to enter the channel of the sole in sewed work, and being free from feed device, edge-guide, or support. The operator takes the lasted shoe in his hands, places the sole in the proper position thereon, presents it to the nose, and operates the treadle so as to set the machine in motion, and drives the tack, and so continues the operation, using the upward pressure of his hands to keep the sole close to the nose until the sole is laid.

In this operation the sole is fed by hand, first presenting the toe and then the heel, and wherever a nail or tack is needed.

A denotes the stock, head, or frame for supporting the operative parts, and it terminates in or is provided with the guide-nose B, which has a vertical passage, *a*, leading through it. The nose is small, and projects a sufficient distance down from the head to enter the channel and allow the sole to be moved along freely over it, as shown in Figs. 3 A and 10, which latter is a perspective view of the nose detached. Through the passage *a* the nail or tack, after being severed from the wire, is driven or forced by the driver. (Shown at *c*.) The said driver is fixed in the lower part of the bar or vertical slide-rod C. This bar is arranged to move in bearings in the frame or stock A, and provided with a spring, D, the purpose of which is to depress the driver-bar after each elevation of it, such depression being with power sufficient to cause the driver to force the nail or tack into the article into which it may be driven.

Within the frame or stock A, and disposed therein, as represented, is the main horizontal shaft E, carrying a pinion, F, on its rear end. This pinion engages with a gear, *d*, arranged on a stationary arbor, *e*. There is fixed to the gear *d*, on one side of it, a ratchet-wheel, *f*, (see Fig. 4, which is a side view of the ratchet-wheel and gear,) with which a draw-pawl, *g*, Fig. 2, applied to one side of a wheel, *h*, and provided with an actuating-spring, $s^3$, operates. The wheel *h* turns freely on a sleeve of said ratchet-gear, and, while in operation, has a reciprocating rotary motion, effected by a pedal connected with the wheel by a rod, *i*, Figs. 3 and 3A, pivoted to the two, a spring being used to elevate the pedal and rod, as shown in Fig. 3A. An entire revolution is imparted to the shaft E during each downward movement of the pedal. A cam-brake wheel, *k*, (shown in side view in Fig. 5,) fixed upon the shaft E, receives in its cam-groove *l* a friction-roll projecting from one side of an arm, *m*, such arm being mounted upon, and extending upward from the rear end of, a horizontal shaft, *n*, fitted in bearings in the lower part of the head, and to whose front end the transferrer L is fixed, the latter deriving its intermittent oscillating movements from the shaft-arm and cam. This transferrer is secured to the lower end of a plate, $L^2$, Figs. 11 and 12, which depends from said shaft *n*, and has its movement close to the face of the head. The transferrer proper has the passage *a*, into which the wire is fed and supported while the nail or tack is being cut off, and which passage is brought, by the action of the cam *l*, coincident with the nose-guide and the driver, when the nail or tack is to be driven. The transferrer, therefore, is arranged to operate between the nose-guide and the driver, in order that the nose may project free of any hinderance, for the presentation and pressure ure of the sole thereagainst. There is fixed on the shaft E, at its front end, a cam or lifter, O, to effect the elevation of the driver-carrier C at proper times, and to allow it to be driven down by the spring D, arranged in the turret.

The wire from which the nails or tacks are to be successively cut is led through a passage, *w*, in a fixed guide, I, and thence between the guide K and the milled or toothed periphery of a feed-wheel, K; thence through a conduit, *v*, to, and past, the cutters, one of which, *x*, is fixed horizontally at the side forming the wire-conduit *v*, and the other to the transferrer. From the conduit *v* the wire passes into passage *z* of the transferrer.

The said transferrer carries the movable cutter *y* on a line with the top of its passage *z*, which, operating in conjunction with the stationary cutter *x*, serves, at the proper period, to sever a nail or tack from the wire.

By the oscillation of the transferrer L toward the fixed cutter *x* the wire will be cut, or the tack will be severed, from it by the cutters, as shown in Fig. 12, and subsequently—that is, by the oscillation of the transferrer away from the fixed cutter—the tack will be moved directly over, and in line with, the guide-nose passage *a*, ready to be driven by the driver, as in Fig. 11.

By this construction and operation the tack will be cut, by a distinct movement of the transferrer in one direction, and, by a reverse movement, bring the tack over the nose-guide. These two movements are effected by the cam *l*, and they are, of course, timed with the action of the driver and the feed of the wire.

There is applied to the periphery of the cam-wheel *k* a friction-brake or presser-foot, $a^2$, which, arranged in the frame, has a spring, $b^2$, for forcing it against said wheel, the elastic force or pressure of the spring being increased or diminished by a screw, $c^2$, screwed into the frame or head A, and against the end of the spring. This friction-brake is to prevent the cam-wheel from being revolved, by its momentum, beyond what may be necessary for its successful action. The brake $a^2$ is also to hold the shaft E from revolving while the pawl-carrying wheel *h* is being moved backward, so as to slip the pawl *g* over the ratchet-wheel *f*. The feed-wheel K revolves loosely upon a short arbor, $k^1$, Fig. 7, projecting from the head, and through which the ratchet-armed shaft *n'* extends. A ratchet or pawl, *l'*, carried by an arm, *m'*, and arranged with the toothed periphery of the feed-wheel, operates such wheel. The arm *m'* is fixed to, and projects radially from, the outer end of the shaft *n'*, which has on its rear end a radial arm, *o'*, carrying a friction-roll, *p'*, to act against the periphery of a cam, *q'*, fixed on the outer side of the cam-wheel *k*, the shape of the cam *q'* being shown in Fig. 6, and its action on the arm *o* oscillates the shaft *n'*, and moves the feed-wheel by the ratchet-pawl. There is connected to the arm *o'* a spring, *r'*, which is fastened to a projection, $s^1$, from the frame or head. This spring draws and keeps the friction-roll closely up to the cam.

Fig. 7 is a horizontal section, taken through the axis of the double-armed shaft *n'*, and the contiguous parts, showing the sleeved lever, its friction-brake, and the double-armed shaft *n'*. There projects backward from the frame A, and concentric with the shaft *n'*, a tubular arbor, *t'*, Fig. 7, which constitutes the fulcrum and bearing of the sleeved lever R, top and side views of such lever being given in Figs. 8 and 9. From the short arm *u'*, at the inner end of the sleeve of such lever, a stud, *v'*, is extended to bear against the inner side of the arm *o'*, and serve as a stop for the latter. The handle or lever R is hollow or chambered to receive a spring, *x'*, which is held in place in the arm by a screw, *y'*, screwed therein and against the outer end of the spring. The inner end of the spring bears against the sleeve-arbor *t'*, and its force is regulated by the screw $y'$, and it serves as a brake to hold the sleeve-lever in its adjustment upon the fixed arbor $t'$, and which adjustment governs, by the short arm $u'$, the extent of movement of the long arm $o'$, and the feed of the pawl. From said sleeve-lever an arm, $z'$, extends between the ends of two screws or adjustable stops, $a^3$ $b^3$, arranged in the frame A in line with each other, so as to limit the movement of said arm. The purpose of the sleeve-lever and the adjustable stops $a^3$ $b^3$ is to regulate the extent of movement of the arm $o'$ toward the cam $q'$, and, as a consequence, the feeding of the wire, in order to cause the tack cut off and driven to have any desirable length. By taking hold of the arm or lever R an attendant moves the arm $z'$ between the stops more or less, as may be requisite, to vary the feed of the wire, the spring of the lever sufficing to hold, by the friction of a bearing-piece upon the sleeve-arbor $t'$, the lever in the position in which it may be so placed.

By turning the lever down, Figs. 13 and 14, the stud $v'$ acts upon the inner side of the arm $o'$, and keeps it farther away from the cam $q'$, and thus lessens the movement of the feed-wheel, and shortens the length of the nail or tack; but, by raising the lever, the stud $v'$ is carried away from the arm $o'$, and the latter thereby allowed to come nearer to the lesser-acting part of the cam $q'$, and thus increase the movement of the feed-wheel and the length of the nail or tack, and this adjustment of the lever is governed within fixed limits by the adjustable stops.

Figs. 11 and 12 represent front views of the transferrer and cutter devices in different positions, the cutter securing plates being removed, in which Fig. 11 shows the transferrer in its outward movement to bring its passage $a$ in line with the driver, and Fig. 12 shows the transferrer in its inward movement to receive the wire, and also to bring the cutters together to sever the wire.

The fixed guide I for the wire is arranged just outside and between the feed-wheel K and a guide-roll, K', to give a proper support to the wire in being drawn into the fixed guide $o$, which terminates just on the under side of the feed-wheel.

Figs. 13 and 14 show sectional views of the sleeved lever R and its short stop-arm $u'$ $v'$, and the relation it occupies to the arm $o'$ of the ratchet-shaft $n'$, in order to adjust and hold said arm $o'$ away from the lesser-acting part of the cam $q'$, as in Fig. 14, to diminish the feed movement received by the arm $o'$ from the feed-operating cam. The spring $r'$ holds the arm $o'$ up to the cam, except when prevented from so doing by the stop-stud $w'$, adjusted to bear against the arm $o'$, as in Fig. 14, to limit the inward movement of the latter.

The guide-nose B, as shown in Fig. 10, projects from the end of a bar, B', which is bolted into a seat formed in the under side of the head in an upwardly-inclined position, the top face $a^1$ of the nose end being level, and the shoulders $a^4$ $a^4$ keeping it firmly in place, while the driver rises out of the way of the nose, leaving the latter free for use, as before stated.

Having described a tacking-machine for laying the soles of shoes, I claim—

In a machine for driving tacks or nails in the soles of boots and shoes, the combination, with the tack or nail, feeding, cutting, and driving mechanisms, of treadle-power mechanism for operating these elements, and an unobstructed guide-nose tube adapted to receive a boot or shoe at the hands of an operator, all substantially as and for the purpose described.

In testimony whereof I have affixed my signature in the presence of two witnesses.

LOUIS GODDU.

Witnesses:
N. S. HOTCHKISS,
GEO. T. ANGELL.